United States Patent
Van Rens et al.

(10) Patent No.: US 6,711,875 B2
(45) Date of Patent: Mar. 30, 2004

(54) FORM-FILL-SEAL MACHINE

(75) Inventors: Joseph Johan Maria Van Rens, Weert (NL); Peter Joseph Hendriks, Weert (NL); Wilhelmus Catharina Gerardus Maria Tax, Weert (NL); Peter Hubertus Daal, Linne (NL)

(73) Assignee: Aquarius B.V., Weert (NL)

( * ) Notice: Subject to any disclaimer, the term of this patent is extended or adjusted under 35 U.S.C. 154(b) by 0 days.

(21) Appl. No.: 09/985,037

(22) Filed: Nov. 1, 2001

(65) Prior Publication Data

US 2002/0088202 A1 Jul. 11, 2002

(30) Foreign Application Priority Data

Nov. 1, 2000 (NL) .............................................. 1016524

(51) Int. Cl.[7] .............................................. B65B 61/20
(52) U.S. Cl. ........................ 53/133.4; 53/139.2; 53/550
(58) Field of Search .............................. 53/133.4, 139.2, 53/412, 416, 451, 550, 551

(56) References Cited

U.S. PATENT DOCUMENTS

| 3,182,998 A | 5/1965 | Peterson |
| 4,614,512 A | 9/1986 | Capdeboscq |
| 4,617,683 A | 10/1986 | Christoff |
| 4,655,862 A | 4/1987 | Christoff et al. |
| 4,709,389 A | 11/1987 | Langenberg et al. |
| 4,878,987 A | 11/1989 | Ven Erden |
| 4,909,017 A | 3/1990 | McMahon et al. |
| 5,373,933 A | 12/1994 | Planke et al. |
| 5,600,906 A | 2/1997 | Hamid |
| 5,648,140 A | 7/1997 | Vaders |
| 5,672,009 A | 9/1997 | Malin |
| 5,776,045 A | * 7/1998 | Bodolay et al. ............ 493/215 |
| 6,044,621 A | * 4/2000 | Malin et al. .................. 53/412 |
| 6,350,340 B1 | * 2/2002 | Johnson ....................... 156/252 |
| 6,474,044 B1 | * 11/2002 | Simionato .................... 53/412 |

FOREIGN PATENT DOCUMENTS

| EP | 0 873 856 A2 | 10/1998 |
| WO | 98/03328 | 1/1998 |

* cited by examiner

*Primary Examiner*—Stephen F. Gerrity
*Assistant Examiner*—Hemant M Desai
(74) *Attorney, Agent, or Firm*—Young & Thompson (57) ABSTRACT

Form-fill-seal machine includes parts for moving a web of packaging material through the machine according to a process path and parts for transforming the web into filled bags, as well as a zipper strip applicator device for supplying a zipper strip for each bag transverse to the process path, by use of a first and a second conveyor, which in the supply direction of the zipper strip are placed one behind the other and are both provided with parts for retaining the zipper strip during supply, a blade being placed between the first and the second conveyor for cutting the zipper strip and the first and the second conveyor being provided with their own first and second drive.

25 Claims, 10 Drawing Sheets

FORM-FILL-SEAL MACHINE

FIELD OF THE INVENTION

The invention relates to a form-fill-seal machine, particularly a form-fill-seal machine wherein a web of bag material, such as foil, before transforming it into a tubular shape, is provided with so-called zipper strips, one for each bag to be made/filled. Said zipper strips generally consist of two strip members situated opposite each other and provided with male and female parts that can be brought into detachable engagement with each other, are taken from a stock and are applied transverse to the web, either with or without a limited pre-weld or pre-adhesion. In the action of transverse sealing the bags, the zipper strip is also permanently welded to the bag walls.

BRIEF DESCRIPTION OF THE INVENTION

From U.S. Pat. No. 4,617,683 it is known to apply a zipper strip provided with adjacent male and female parts, over the full width of a web of bag material, by engaging a leading area with a vacuum head and moving the head transverse over the upper side of the web to the other edge. Subsequently the zipper strip is welded to the web by means of a thermal seal rod extending from above and an anvil. Alternatively the zipper strip may be provided with a heat activated glue.

From U.S. Pat. No. 4,878,987 it is known to supply the cooperating male and female parts of the zipper strip from both sides, transverse to the web, by means of pusher rolls. The male and female strips are then each pushed from their side towards the center, guided by transverse ducts, and then welded to the web.

From the international patent application WO 98/03328 it is known to place a zipper strip transverse to the web of bag material by means of a vacuum band positioned above the web and weld the strip to the bag material.

Applying the zipper strips requires a high control of the orientation and the exact location of the strips, as imperfections in it may hinder the further process and may result in malfunctioning.

OBJECT OF THE INVENTION

It is an object of the invention to provide a form-fill-seal machine of the type mentioned in the preamble with which a very high degree of control can be achieved in placing the zipper strips.

It is a further object of the invention to provide a form-fill-seal machine of the type mentioned in the preamble, with which a high processing speed can be realized of high accuracy.

SUMMARY OF THE INVENTION

From one aspect the invention to that end provides a form-fill-seal machine comprising means for moving a web of packaging material through the machine according to a process path and means for transforming the web into filled bags, furthermore comprising a zipper strip applicator device having means for supplying a zipper strip for each bag transverse to the process path, which supply means comprise a first and a second conveyor, which in the supply direction of the zipper strip are placed one behind the other and are both provided with means for retaining or engaging the zipper strip during supply, a cutting means such as a blade being placed between the first and the second conveyor for cutting the zipper strip and the first and the second conveyor being provided with their own first and second drive means.

The division into two conveyors makes it possible to divide functions as well, and namely a supply function for the first conveyor and a positioning function for the second conveyor, the zipper strip each time being held over his length by the first and/or second conveyor.

Preferably the machine is provided with control means for the first and second drive means and the blade, the control means being adjusted to consecutively operate the first drive means to transfer a predetermined length of zipper strip to the second conveyor, to subsequently operate the blade and then operate the second conveyor for positioning the cut-off zipper strip portion transverse to the web.

Preferably the control means are adjusted to let both conveyors move at the same speed during the supply of the length of zipper strip.

It is preferred here that the retaining means of the first and the second conveyors as well are controlled by the control means, preferably for continuously activating them. They may be designed as vacuum band means—known per se—. In view of efficiency of the suction and creating as few as possible process disrupting air flows, it is advantageous when the machine is provided with means for adjusting the active length of the vacuum means for the second conveyor. Preferably the control means are then provided with means for comparing an entered zipper strip length and the position in transverse direction to the web and the adjusted length of the vacuum means, and of means for releasing the drive of the machine based on the outcome of said comparison. When the length of the vacuum means does not correspond to the one necessary for the process in question the machine will not be released.

The means for adjusting the active length of the vacuum means preferably comprise a tube to be connected to a vacuum source, which tube in its circumference is provided with series of apertures of different length extending in tube direction, and which is rotatable in an adjustable manner to let a selected series of apertures form the connection between the apertures in the vacuum band and the tube.

It is further preferred that at least the second conveyor is placed below the web. This improves the stability of the zipper strip.

The controllability of the zipper strip is further improved when the machine is furthermore provided with means for guiding the zipper strip on the first and/or second conveyor, which guiding means are preferably formed by a rigid guiding strip, which is positioned to extend between the male and female parts of the zipper strip. In this way the zipper strip is guided in sideward direction, so that it is prevented that it would want to run off from the conveyors as a result of its natural inclination to warp in the main plane.

Preferably the guiding strip is interrupted, and it is particularly formed by a series of teeth, so that frictional forces, that may counteract a smooth supply of the zipper strip, are limited to a minimum. The guidance is improved when the teeth have inclined side edges and/or rounded tips.

As a result of the interrupted guidance, in particular the teeth, the negative effects of the undulation in the zipper strip, which undulation is the result of the rolled-up position in which the zipper strip material is supplied, is further reduced, because of reduction of the friction and the guidance in the vertical plane. As a result the grip of the retaining means, particularly the vacuum means is improved.

Preferably the guiding strip is positioned to—considered in process path-engage the upstream side of the zipper strip, between the strip members having the male and female parts.

In a further development the zipper strip applicator device is also provided with an anvil strip for use in the pre-sealing of the zipper strip to the web, which anvil strip then is preferably situated at the—considered in process path—downstream side of the second conveyor. The applicator device here also provides a counter force during the pre-sealing.

In a further development the zipper strip applicator device is supported on an auxiliary frame, which itself is supported in a main frame of the machine, the auxiliary frame with respect to the main frame being moveable between a retracted operative position and an extended adjustment position. The initial insertion of the zipper strip can then take place in an easily accessible manner. It is preferred here that a calibration is provided on the second conveyor, extending along the retaining means, preferably starting at the location of the blade.

When the machine is further provided with control means that have been provided with means for noticing the operative position of the auxiliary frame and with means for releasing the drive of the machine based on that observation, it is ensured that only in case of a correct position of the auxiliary frame and thus of the applicator device the machine can start running.

From a further aspect the invention provides a form-fill-seal machine comprising means for moving a web of packaging material through the machine according to a process path and means for transforming the web into filled bags, further comprising a zipper strip applicator device having means for supplying a zipper strip for each bag transverse to the process path, which zipper strip applicator device is supported on an auxiliary frame, which itself is supported in a main frame of the machine, the auxiliary frame with respect to the main frame being moveable between a retracted operative position and an extended adjustment position.

From another aspect the invention provides a form-fill-seal machine of the type described in the preamble, further provided with control means having means for noticing the position of a longitudinal edge of the web with respect to a fixed reference in the machine. This also provides a condition for further optimizing the accuracy of the placement of the zipper strip. It may also be possible in this way to influence the position in transverse direction of the web with respect to the form shoulder.

In a further development hereof the machine is also provided with means for positioning the zipper strip applicator device in transverse direction, in response to the data from the edge noticing means. By thus watching the position of the web side and automatically correcting the position of the applicator, errors in the width-positioning of the zipper strip with respect to the web edge as a result of sideward movement of the web is prevented. The means for positioning the zipper strip applicator device in transverse direction may be formed by a servo-driven spindle motor.

In another further development the control means are adapted to control the drive of in particular the second conveyor in the movement of the zipper strip to be applied, in response to the data from the edge noticing means.

From yet another aspect the invention provides a form-fill-seal machine of the type described in the preamble, furthermore provided with control means having first means for noticing longitudinal marks on the web and for measuring the web distance travelled over a certain period by the web at that location, which are placed near the zipper strip applicator device, at least for the noticing means at a distance from it known to the control means, the control means being adapted to control the drive(s) of the zipper strip applicator device, such as the said first and second conveyor, in response to the data from the first means for noticing longitudinal marks on the web and for measuring the web distance.

From a further aspect the invention provides a form-fill-seal machine of the type mentioned in the preamble, furthermore provided with control means having first means for noticing longitudinal marks on the web and for measuring the web position, which are placed near the zipper strip applicator device, wherein downstream of said first means the machine is provided with an end roll for the web, which is movably arranged on the machine and which can be adjusted in position with respect to the web course by means of movement means, the control means being adapted for controlling the movement means of the end roll for altering the web length between the first means and the transverse sealing means, in response to the data from the first means for noticing longitudinal marks on the web and the measuring of the web position. The end roll may be automatically moved, for instance by sliding or turning away, to increase or reduce the web length between zipper strip applicator device and transverse sealing unit/cutting unit. In this way an accurate placement of the zipper strip with respect to the tracer spot and the transverse seam is ensured again and again.

Preferably the control means are provided with means for storage of data regarding the bag length, the distance between the noticing means and the pre-seal unit for the zipper strip, the distance between the longitudinal mark and the transverse seam of a bag made and the distance between the end transverse sealing means for the zipper strip and the blade for the bags.

Alternatively described the application provides a form-fill-seal machine comprising means for moving a web of packaging material through the machine according to a process path from a web supply side and means for transforming the web into filled bags, further provided with control means having first means for noticing longitudinal marks on the web and for measuring the web position, the control means being provided with means for storage of data regarding the bag length, the machine being provided with an end or turn roll for the web, which is movably arranged on the machine in web direction and which is adjustable in position in web direction by means of movement means, the control means being adapted for controlling the movement means of the end roll for altering the length the web has to travel from the supply side to the forming means, in response to the data from the bag length input and the first means for noticing longitudinal marks on the web and measuring the web position.

Alternatively described the patent application provides a form-fill-seal machine comprising means for moving a web of packaging material through the machine according to a process path from a web supply side and means for transforming the web into filled bags, further provided with control means having first means for noticing longitudinal marks on the web and for measuring the web speed, the control means being provided with means for storage of data regarding the bag length, the machine being provided with an end or turn roll for the web, which is movably arranged on the machine in web direction and which is adjustable in position in web direction by means of movement means, the control means being adapted for controlling the movement means of the end roll for altering the length the web has to travel from the supply side to the forming means, in response to the data from the bag length input and the first means for noticing longitudinal marks on the web and measuring the web speed.

From yet a further aspect the invention provides a form-fill-seal machine comprising means for moving a web of packaging material through the machine according to a process path from a web supply side and means for transforming the web into filled bags, further comprising a zipper strip applicator device having means for supplying a zipper strip for each bag transverse to the process path and having means for sealing a zipper strip to the web for each bag to be made, the machine being adapted for making the bags with continuous web supply over the forming means, the machine being provided with means for keeping the web still at the location of the sealing means, and with means placed downstream of the sealing means for forming a buffer web length prior to each keeping still and releasing it during keeping the web still. Thus a reliable, continuous web supply to the moulding and closing means is ensured.

It is preferred here that the end roll and its movement means are a part of the buffer forming means, so that it can be effective in two ways.

From another aspect the invention provides a form-fill-seal machine comprising means for moving a web of packaging material through the machine according to a process path and means for transforming the web into filled bags, further comprising a zipper strip applicator device having means for supplying a zipper strip for each bag transverse to the process path, which supply means comprise a first and a second conveyor, which in supply direction of the zipper strip are placed one behind the other and are both provided with means for retaining the zipper strip during supply, a blade being placed between the first and second conveyor for cutting the zipper strip. Both conveyors can be driven by one single drive, the transfer to the second conveyor for instance being such that this one runs a little faster than the first conveyor, so that the zipper strip is stretched during positioning.

Preferably the first and the second conveyor are positioned to support the zipper strip.

Preferably the retaining means are vacuum means.

From a further aspect the application provides a form-fill-seal comprising means for moving a web of packaging material through the machine according to a process path and means for transforming the web into filled bags, further comprising a zipper strip applicator device having means for supplying a zipper strip for each bag transverse to the process path, which supply means comprise a conveyor positioned transverse to the process path, which is positioned to support the zipper strip and is provided with means for retaining the zipper strip during the supply and pre-sealing at the lower side of the web. The support of the zipper strip improves its stability during supply and positioning, so that the zipper strip can be accurately applied.

It is noted that measures discussed above, such as web side watcher, the end roll and the adjustment means for the active length of the vacuum band, can be used both in an arrangement with two conveyors and in an arrangement with one continuous conveyor.

From a further aspect the application provides a form-fill-seal machine comprising means for moving a web of packaging material through the machine according to a process path and means for transforming the web into filled bags, further comprising a zipper strip applicator device having means for supplying a zipper strip for each bag transverse to the process path, which supply means comprise a conveyor positioned transverse to the process path, furthermore provided with means for permanently adhering both the strip members provided with male and female parts respectively of the zipper strip, at locations that are situated at a mutual distance corresponding to the desired length of the cut-off zipper strips to the applied, the adhering means comprising two adhering members, which engage on both sides of the male and female parts to seal them to each other. In this way a bulge in the zipper strip ends is prevented, which is favourable to the manageability in the further process. The so-called "crunching" can now take place with a running zipper strip. By adapting the control means at the wanted strip length and with the known distance between blade and crunch unit, as well as with known supply speed of the zipper strip, the correct moment for crunching can be automatically determined and at that moment the crunch unit can be activated.

Preferably two adhering members are positioned to enclose the male and female parts between them during sealing.

It is further preferred here that the two adhering members comprise a rotatable or idle anvil and a sealing arm, particularly ultrasonic sealing arm. The freely rotatable anvil prevents unwanted frictional forces and the arm is only in contact with the strip when crunching has to take place.

From a further aspect the invention provides a form-fill-seal machine comprising means for moving a web of packaging material through the machine according to a process path and means for transforming the web into a tubular shape, turning it into bags, filling the bags and closing the filled bags, the means for transforming into the tubular shape comprising longitudinal guides, placed at a mutual distance corresponding to the zipper strip length, for guiding the tube from the transformation means to the location of filling. Preferably the filling means comprise a chute, which at the outside is provided with longitudinal guides. Thus it is prevented that the tubular web twists and the zipper strip would not lie correctly any more and no good transverse seal could be made. Because of the longitudinal guides the largest circumferential size of the chute is not changed, but the strips lie within said circumferential size.

BRIEF DESCRIPTION OF THE DRAWINGS

The inventions will be elucidated on the basis of a number of exemplary embodiments shown in the attached figures, in which.

DETAILED DESCRIPTION OF THE PREFERRED EMBODIMENTS

Figure 1:
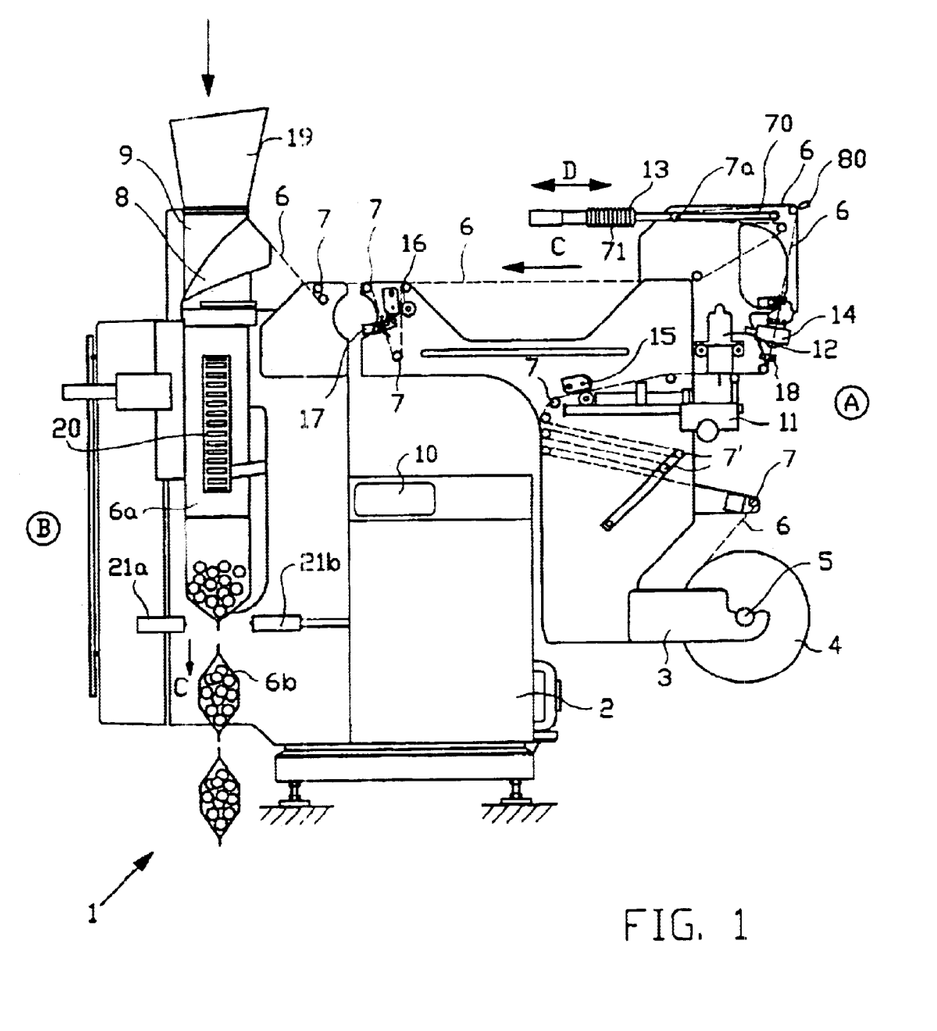
FIG. 1 is a form-fill-seal machine according to the invention in side view.
Figures 2, 2A:
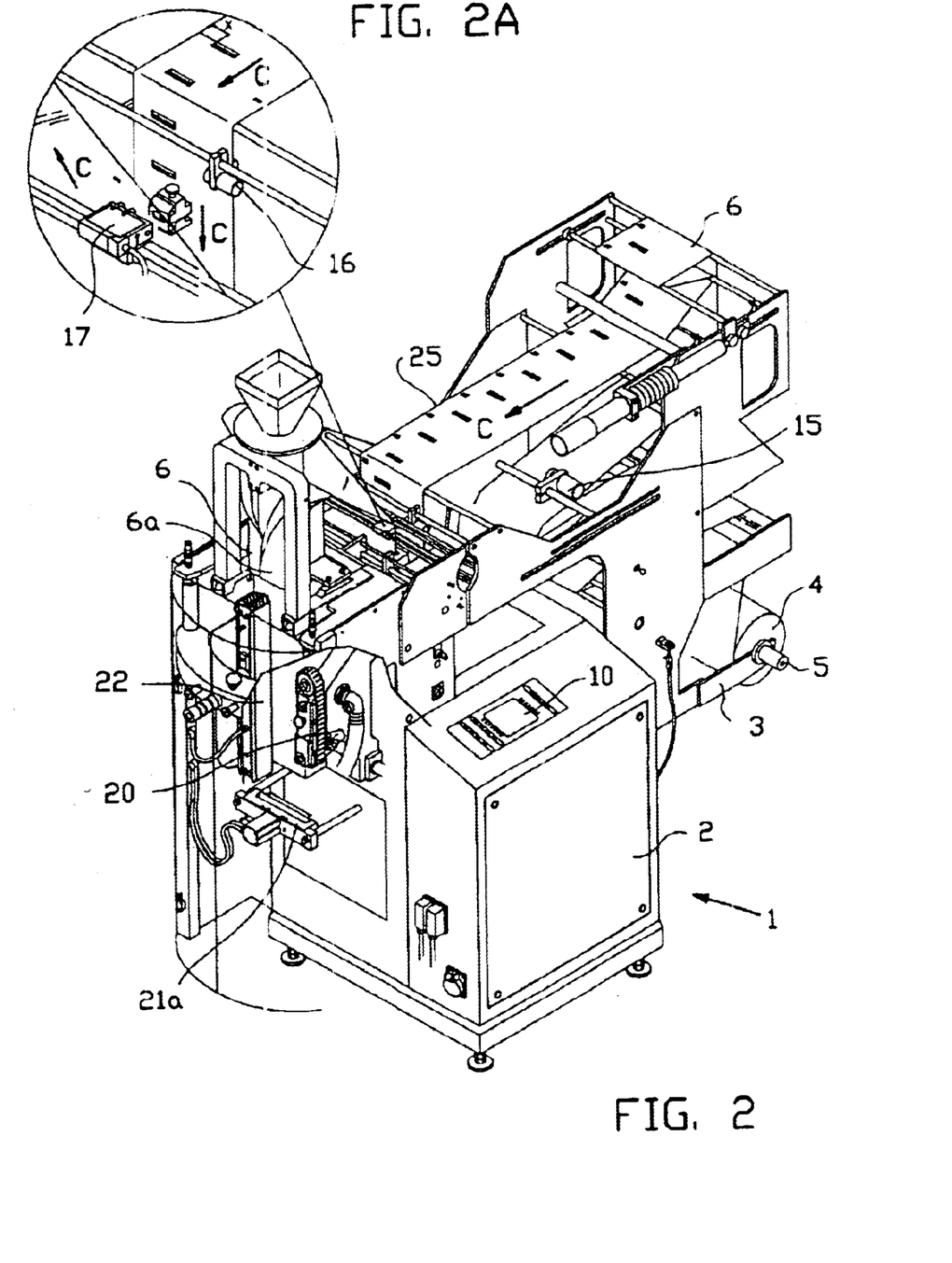
FIG. 2 is a view in perspective of the form-fill-seal machine of FIG. 1, obliquely from its front side.
FIG. 2A is a detail of the form-fill-seal machine of FIG. 2.
Figure 3:
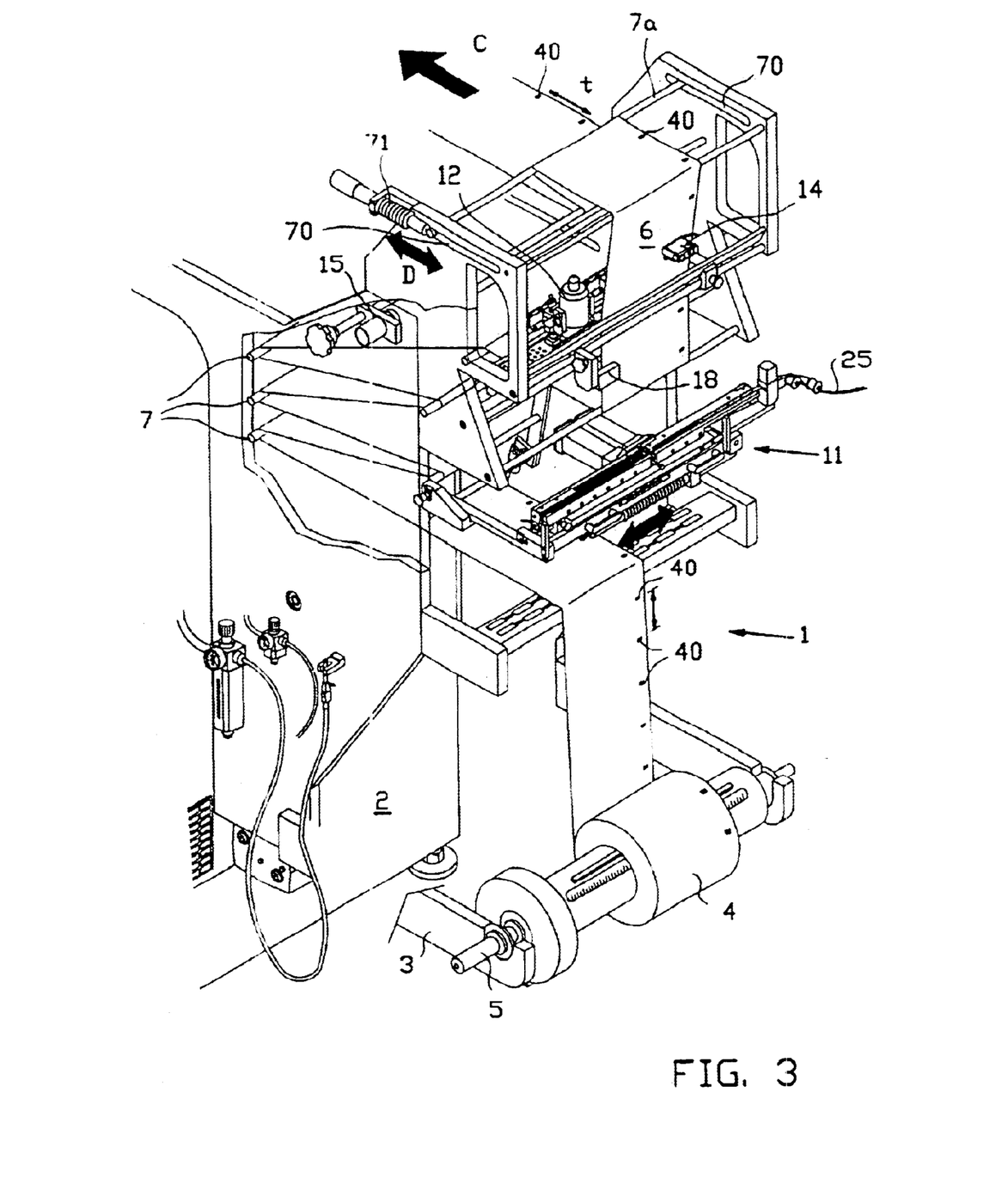
FIG. 3 is a view in perspective at the rear side of the form-fill-seal machine of the FIGS. 1 and 2.

The-form-fill-seal machine 1 shown in FIGS. 1–3 comprises a chassis or frame 2, on which various parts and control means have been arranged to manufacture a series of bags 6b filled with bulk goods, such as foodstuffs, but also inedible bulk goods, from a foil web 6, that is supplied on a roll 4.

On frame 2 outriggers 3 are provided, in which a transverse axis 5 can be supported. On the axis 5 a roll 4 of foil web 6 has been placed.

For reasons of simplicity a number of parts in process direction will be named. The foil web 6 is guided about a number of balancer rolls 7', which also ensure that the foil web is locally at the wanted tension, and a number of rolls 7.

After some rolls 7 and 7' have been passed, the web 6 passes an incremental encoder 15, and after that over a zipper strip applicator device 11 and therewith below a pre-seal unit 12. The zipper strip applicator device 11 supplies the zipper strip, as will be discussed further, in the direction transverse to the process path of the web 6. The pre-seal unit 12 secures the zipper strip to the foil web 6 by means of applying heat and pressure, so that the zipper strip is taken along in a reliable manner to the station where the bags are finally formed and closed.

Downstream of it a web edge follower 18 is positioned, which, with transmitter and receiver that at that side are situated on both sides of the foil web, acoustically notices where—considered in transverse direction—the foil web material is situated and where it is not, and thus notices the position of the foil web edge.

Downstream of it a photo cell 14 is situated, the position of which is adjustable in transverse direction, and which is designed to notice the tracer spots 40 on the foil web.

Next the web arrives at the location of a web length manipulator 13, which is provided with a bearing roller 7a which is bearing mounted in slots 70 and which can be moved in the direction D by means of spindle motor 71 and which takes up a position calculated by a general control device (not further shown) of the machine.

After that the foil web continues in the direction C, in order to be guided downwards past incremental encoder 16, and then subsequently upwards again past tracer spot photo cell 17, also shown in FIG. 2A.

Subsequently the foil web 6 arrives at a form shoulder 8, where the foil web is transformed into a tubular shape 6a. The form shoulder 8 surrounds a filling tube 9, which at the upper end is provided with a charging funnel 19 for the bulk goods. Usually the bulk goods are discharged batch-wise into the funnel 19.

The foil tube 6a is sealed in longitudinal direction by means of vertical longitudinal sealing bar 22. Vacuum bands 20 are positioned on both sides of the foil tube 6a, which bands do not only ensure transport of the foil tube 6a, but the entire transport of the foil web through the device 1.

At the downstream end of the filling tube 9 transverse welding rods 21a, 21b are arranged, that can be moved towards each other to simultaneously make the upper seam of a lower bag and the lower seam of a subsequent bag positioned above it, and simultaneously separate both bags from each other. The zipper strip is also finally sealed to the foil here. Moreover a cutting blade is present there for separating the bags from each other between two longitudinal seals.

For the control of the various parts and the mutual adjustment of them a control unit is included that is not further shown, to which operation panel 10 is also connected.

Figures 4A, 4B:
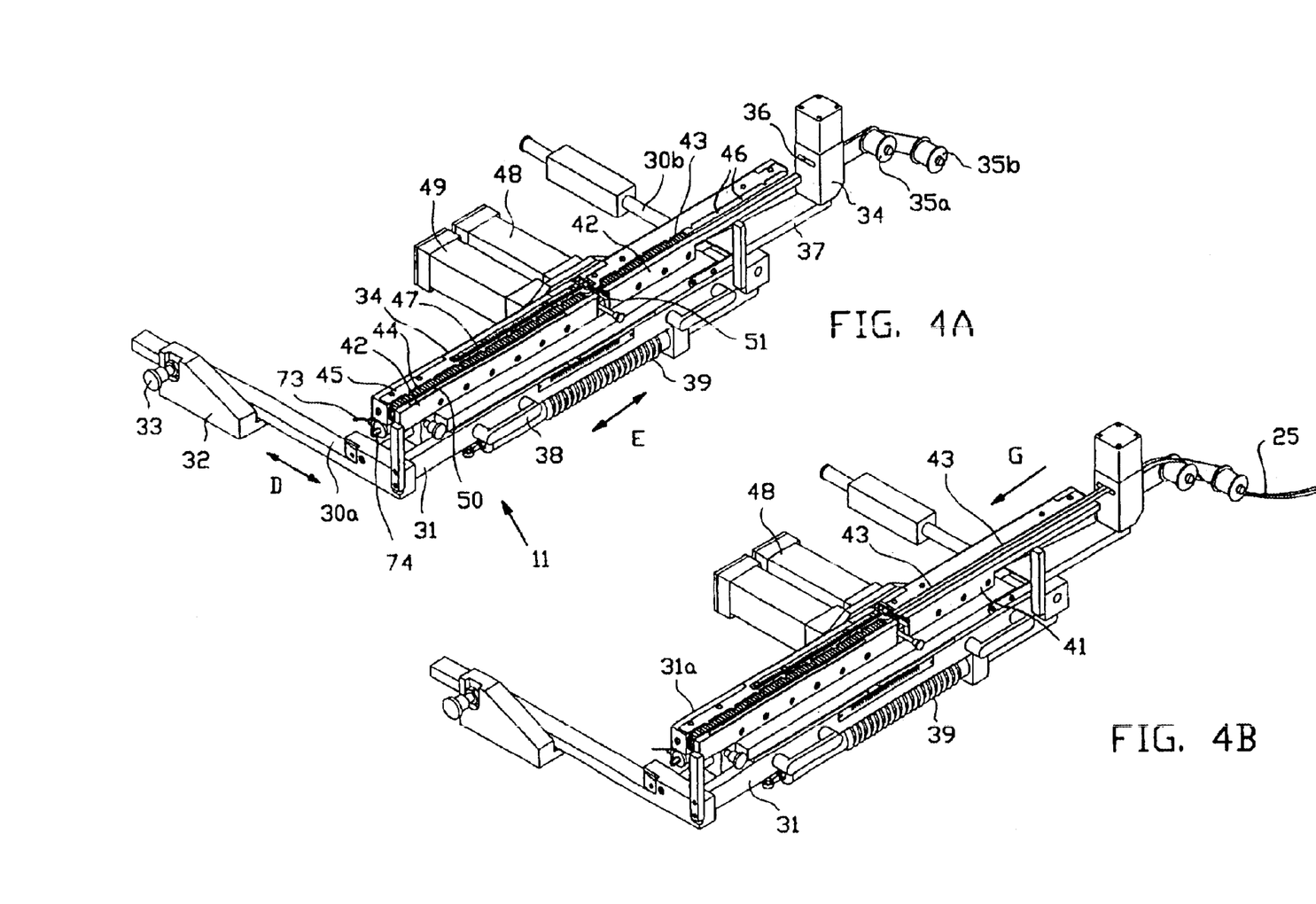
FIGS. 4A–D show a zipper strip applicator device of the form-fill-seal machines of FIGS. 1–3, in consecutive stages of use.
Figures 4C, 4D:
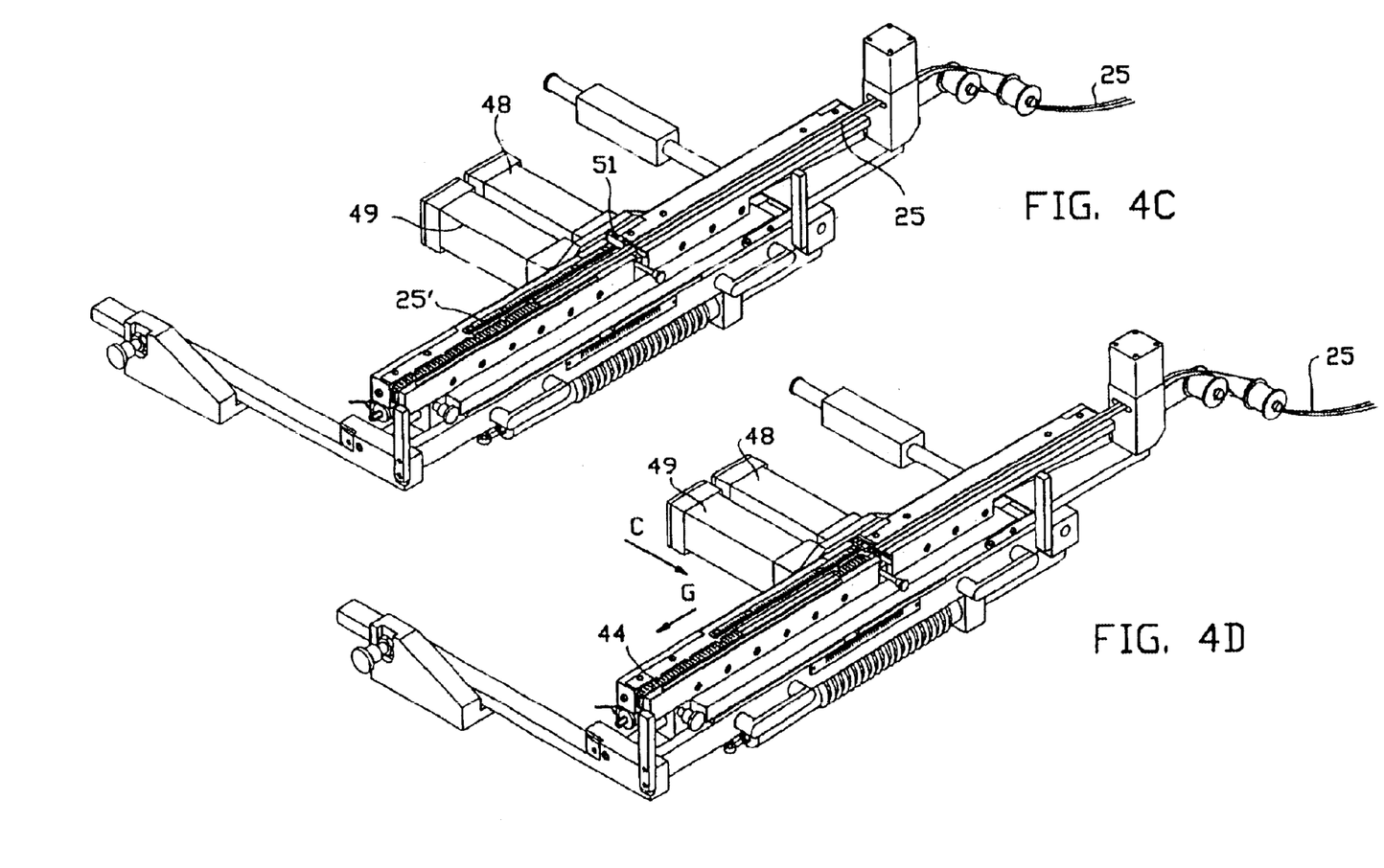

Referring to FIG. 4A the zipper strip applicator device 11 will now be discussed. The zipper strip applicator device 11 is mounted on outriggers 30a, 30b, which can be retracted and extended in the direction D from the frame 2 of the form-fill-seal machine 1. All this is schematically shown, the outrigger 30a supporting on bracket 32 (outrigger 30b can be supported in a similar manner), and can be secured in the operational position by means of turning knob 33. This can also take place by means of snap means that are not further shown. Means that are not further shown are provided to inform the control unit of the machine 1 of the operational position of the device 11. To facilitate the retraction and extending, respectively, of the device 11 it is provided with handle 38.

Between the outriggers 30a, 30b a transverse frame 31 is situated, on which spindle motor 39 is attached with one end. With the other end the spindle motor is attached to frame part 31a, this in order to be able to move it in the direction E and secure it in a chosen position when operated, which then also takes place by the spindle motor 39.

The frame part 31a is also provided with a outrigger 37, on which a support 34 with a passage slit 36 for a zipper strip 25 is arranged. Furthermore idle support rolls 35a and 35b are provided on the passage 36, for guiding the zipper strip 25 in the supply. The machine 1 may further be provided with means for keeping the strip 25 tensionless, so that sufficient supply length is available for the device 11, without the zipper strip 25 having to be pulled from a stock roll by the device 11 itself.

The frame part 31a is also provided with two vacuum devices 41 and 42, which in longitudinal direction have been placed adjacent to each other and between which cutting blade 51 is placed, which cuts in upward direction. Above the blade 51 an anvil that is not further indicated is placed.

The vacuum device 41 is limited in upward direction by a first vacuum band 43, and the vacuum device 42 is upwardly limited by second vacuum band 44. Both bands 43 and 44 are endless and are driven by means of their own servo motors 48, 49, that can be driven independent from each other by the control device accommodated in the machine 1.

Figure 5A:
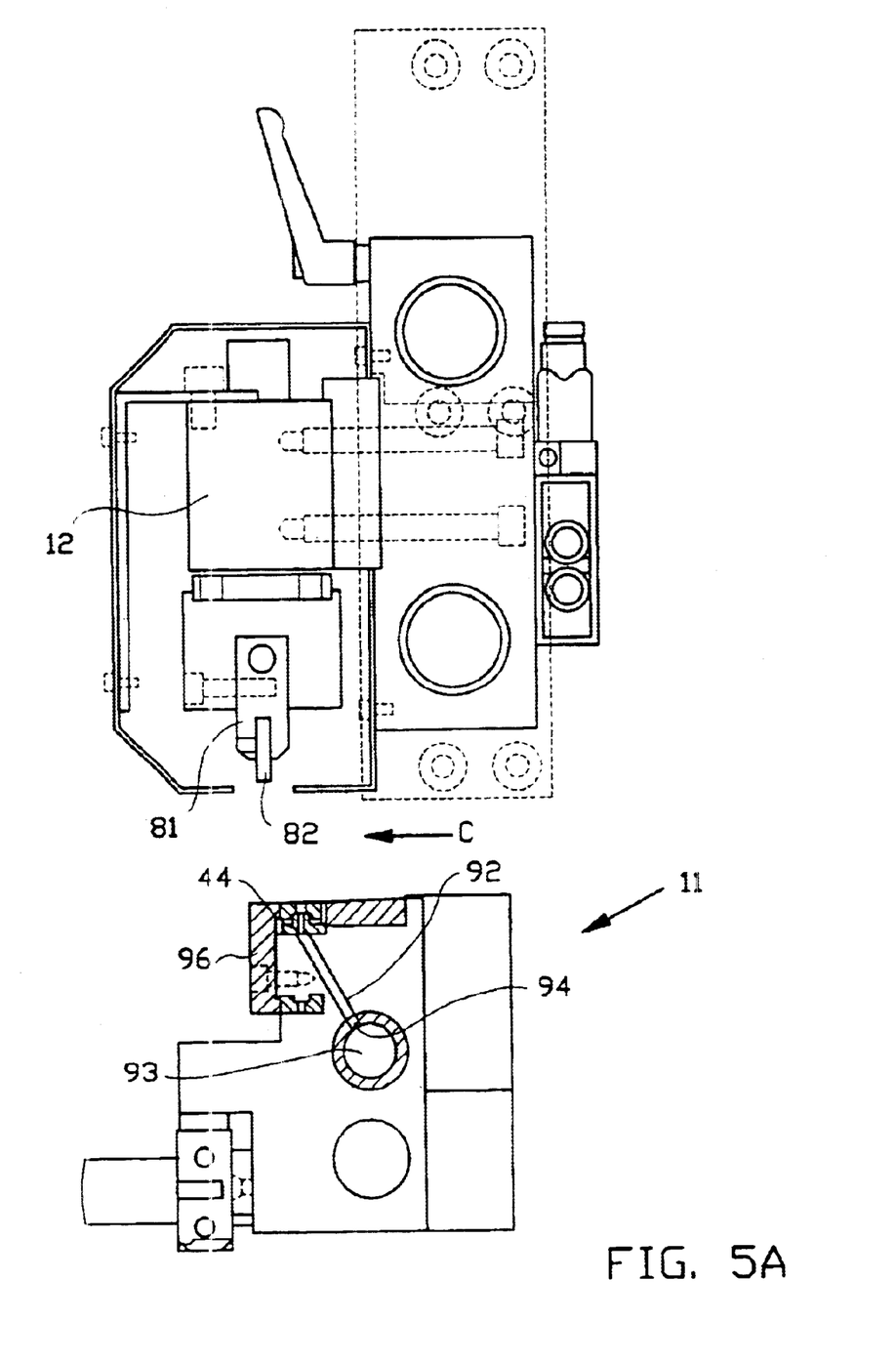
FIGS. 5A–C are some details of the means for adjusting the active length of the zipper strip applicator device.
Figure 5B:
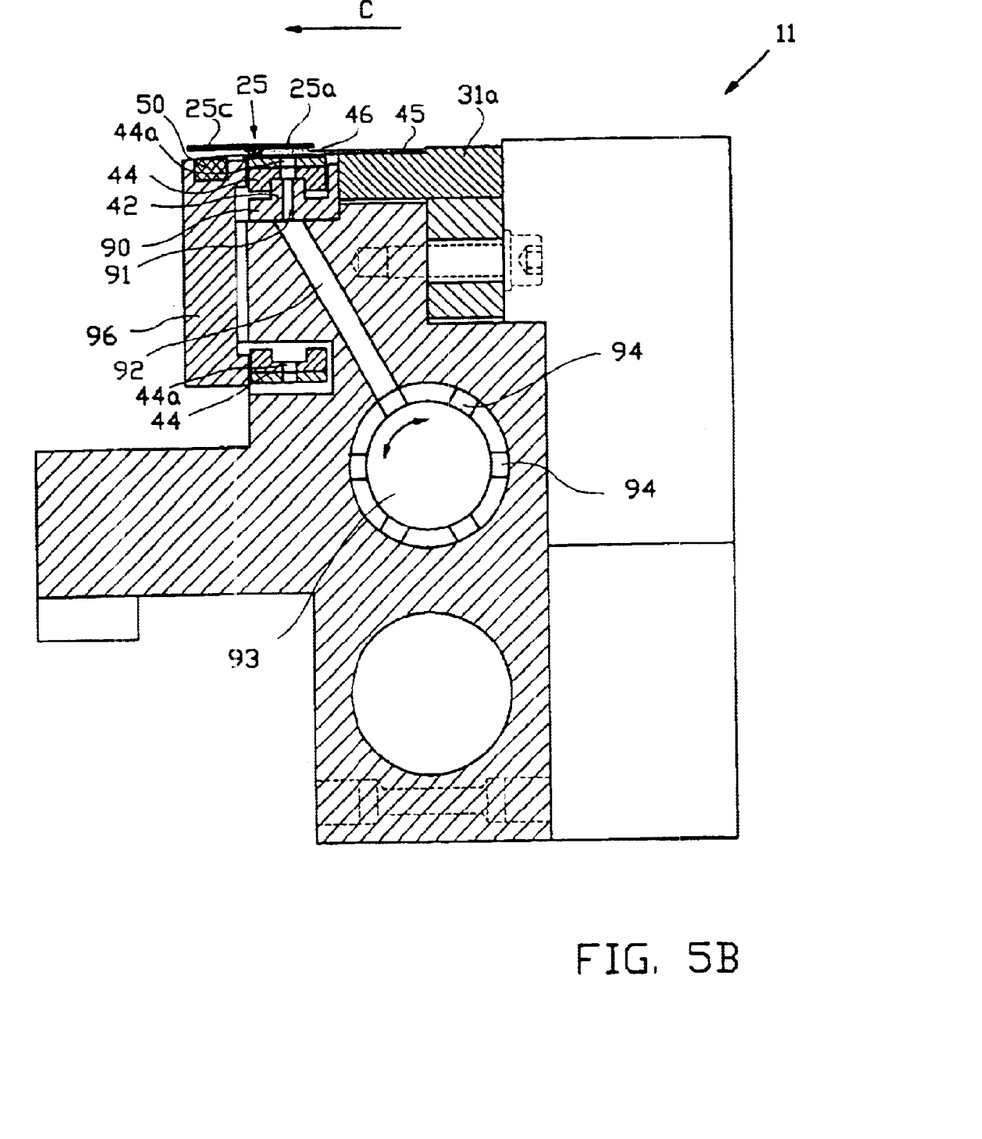
Figure 5C:
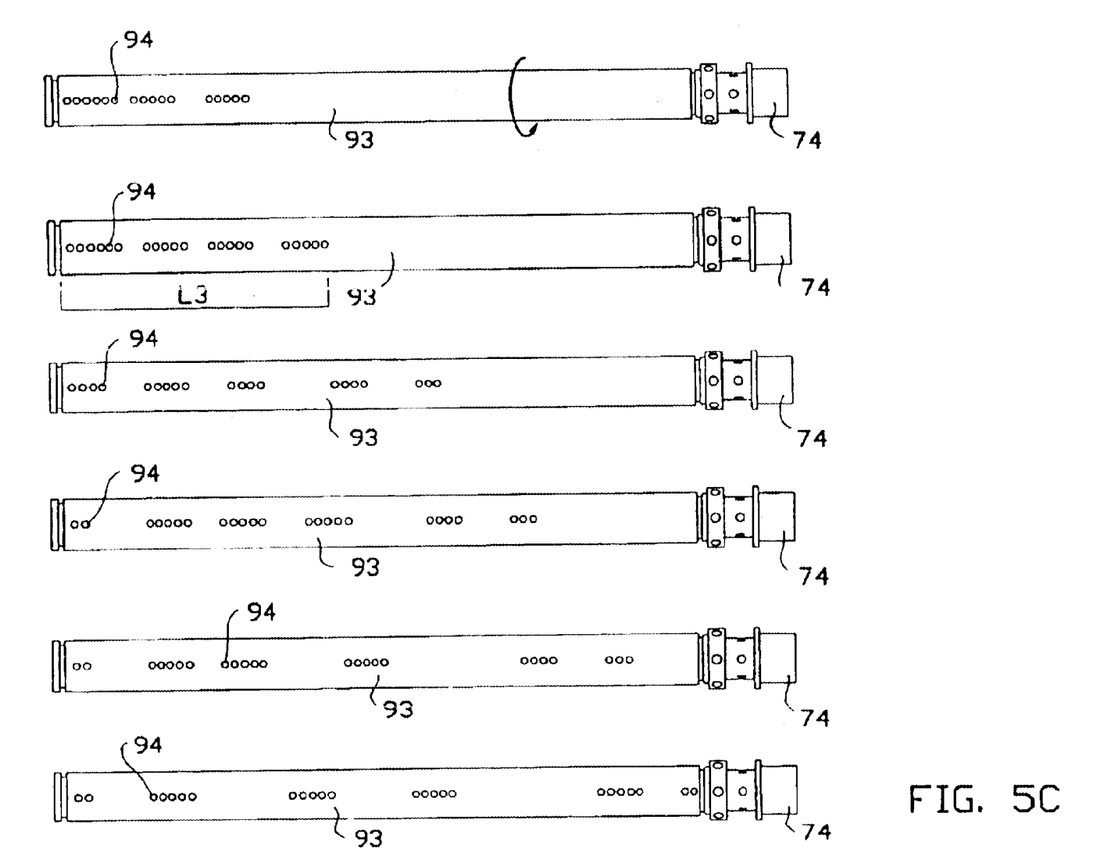

In the FIGS. 5A, 5B and 5C some means for adjusting the active length of the second vacuum conveyor belt 44 are elucidated.

As can be seen in FIG. 5A, the pre-seal station 18 is situated at a short distance above the zipper strip applicator device 11. The pre-seal device 18 is provided with a holder 81, in which a pre-seal rod 82 is accommodated.

Figure 6:
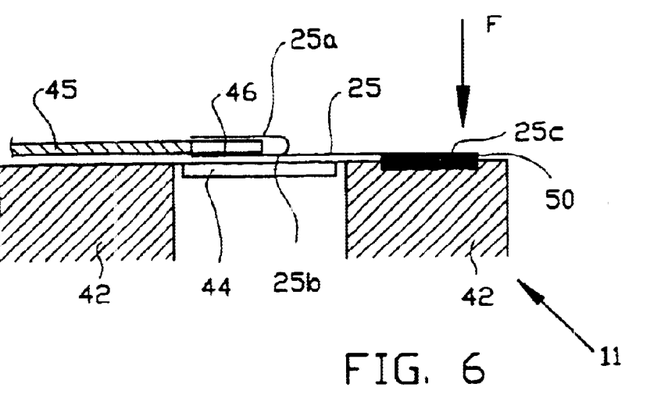
FIG. 6 schematically shows a cross-section of a part of the zipper strip applicator device of the FIGS. 4A–D.

As also clearly shown in FIG. 5B the zipper strip applicator device 11 with portion 31a is provided with an endless vacuum band 44, that is provided with vacuum apertures 44a. The direction of transport of the path C, for that matter, is inverted to the one of FIG. 6 yet to be discussed. This means that the strip 25c to be pre-sealed of the zipper strip 25 is situated at the (downstream) left side, in the drawing above a silicone strip 50, which serves as anvil for the welding rod 82 (in direction F, FIG. 6). The strip 50 is supported on portion 96, that can be taken away to permit replacement of the vacuum band 44.

In the upper course of the vacuum band 44 it runs over longitudinal support 90, which is provided with a series of vacuum apertures 91 extending over its entire length. Said vacuum apertures 91 are in flowing contact with a same series of passages 92 that have been made in the block 31a. The passages 92 are in connection with the series of apertures 94 that have been arranged in the wall of the vacuum tube 93 that is rotatably accommodated in the block 31a. In a manner that is not further shown, said vacuum tube 93 is in connection with a vacuum source in the machine 1.

As can be seen in FIG. 5C, in which six rotation positions of the vacuum tube 93 are shown, the wanted series of apertures 94 can be brought in front of the passages 92, by rotation of the tube 93 by means of the adjustment button 74 that can be reached well by the operator when the device 11 is in the taken-out position. It will be understood that only the passages 92 and thus the apertures 91 that will be connected with the apertures 94, will also be active. The active length of the vacuum band 44 will then correspond to the distance L3 of the series of apertures 94, then to be calculated from the blade 51.

At the in relation to the process direction C upstream side of the bands 43 and 44, a strip 45 is attached to the frame part 31a, which is provided with regularly spaced apart protrusions 46. The protrusions 46 are designed to engage between the strips forming the zipper strip 25, provided with male and female parts of the coupling respectively, extending up to said male and female parts, and keeping the zipper strips stretched particularly in the horizontal plane during transport of the zipper strip, the friction being minimized by the recesses between the teeth 46. Reference can also be made to the cross-section according to FIG. 6.

In an alternative—or further developed—embodiment a so-called crunch unit can be placed between the passage 34 and the frame 31/31a. Said unit is further only schematically shown in the FIGS. 7A and 7B. The so-called crunching of a zipper strip is done to attach both cooperating strips 25a and 25b/c respectively to each other, so that their position one to the other in a bag is maintained therein even after opening the zipper strip and reclosing the zipper strip is easy. Usually this crunching takes place by means of sealing means that engage the zipper strip at the location of the male and female parts, above and underneath, and seal them under pressure. The drawback thereof is that the material bulges sidewards. Said bulges may cause problems during further transportation of the zipper strip over the guides in the machine.

Another drawback is that the location where the crunching unit is active has to be accurately adjusted to the location of the blade that cuts off the zipper strips.

With the crunching unit according to the invention, positioned to be active in a plane transverse to the operation plane of the known crunch units, said problems are solved. In the example of the FIGS. 7A and 7B there is question of a rotating anvil 61, that is positioned immediately along/against the path of movement of the male and female parts. Because the anvil 61 rotates along with the zipper strip a counter plane is provided for the crunching in a friction-poor manner.

Figure 7A:
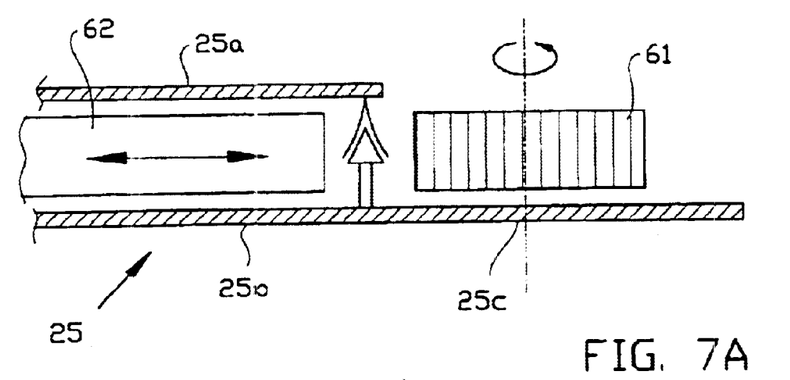
FIGS. 7A and 7B show a cross-section and a top view, respectively, of a so-called crunch unit for use in a form-fill-seal machine having a zipper strip applicator device.
Figure 7B:
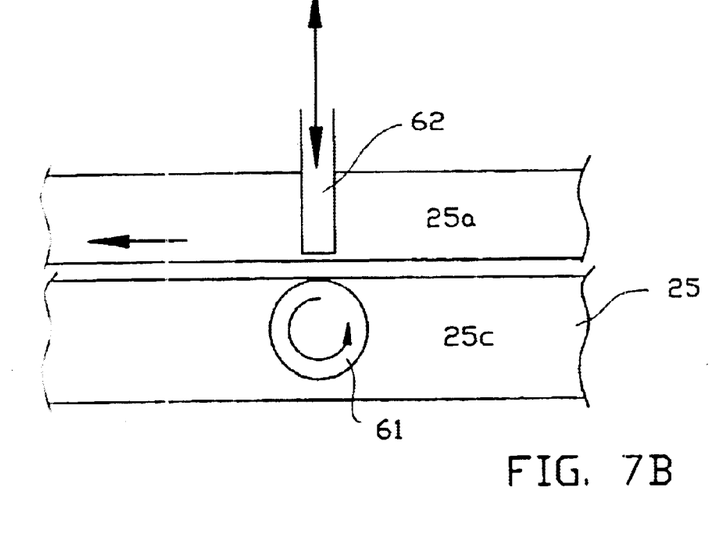

The crunching itself takes place by means of arm 62, which for instance is pneumatically and reciprocally moveable in a direction transverse to the zipper strip between a inoperative position and an operative position, and may extend in the space between the flanges 25a and 25b of the zipper strip 25. When activated the arm will vibrate ultrasonic. Because crunching can now take place on a running zipper strip it is no longer necessary to adjust the distance of the crunching unit to the blade at the zipper strip length. It is sufficient to enter said distance once as a data in the control unit. Said unit can then determine the moment of activation of the arm 62, also on the basis of the data regarding the supply speed of the strip and the wanted zipper strip length, and control it.

During sideward crunching the material can only flow away in longitudinal direction of the zipper strip, which is not disadvantageous for the further transport of the zipper strip. There are no bulges then that render the guiding of the zipper strip difficult.

Figure 8A:
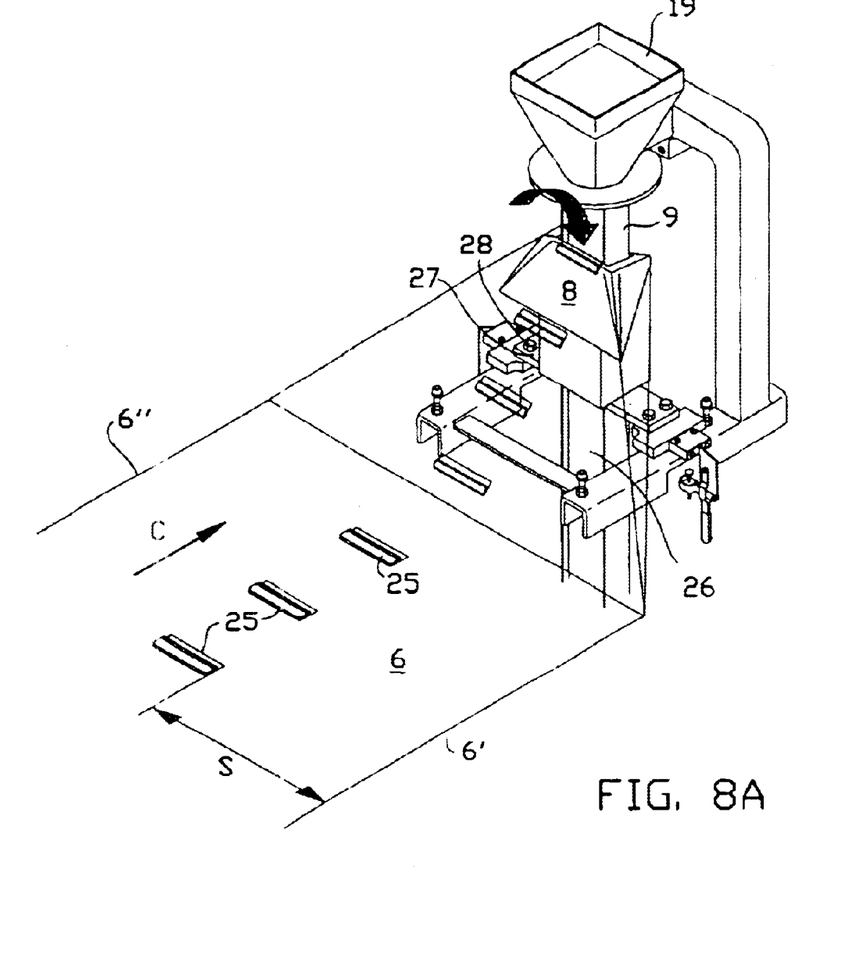
FIGS. 8A ad 8B show a schematic view in perspective of the course of a foil web to and about a form shoulder with consecutive filling tube in a form-fill-seal machine; and a cross-section of said filling tube, respectively.
Figure 8B:
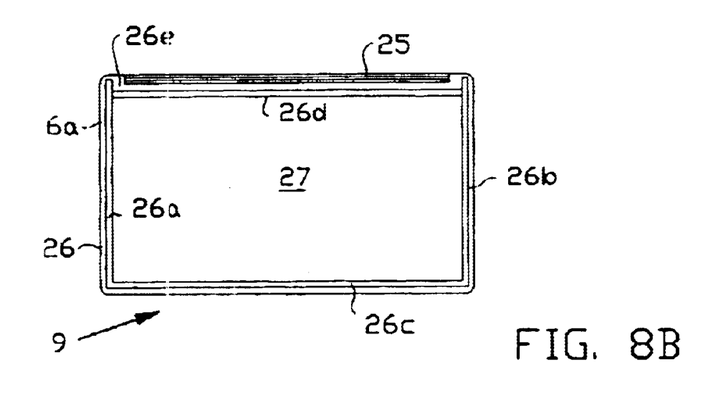

In the FIGS. 8A and 8B a further aspect of the device according to the application is shown, destined for use in making bags using a square or rectangular filling/form tube. The web 6 is transformed into tube 6a by form shoulder 8, the zipper strip 25 being situated at the rear side. In order to rule out any torsion of the tube 6a during downward transport, the filling tube 9 is provided with walls 26c, 26a, 26b and 26d, the walls 26a and 26b extending beyond the wall 26d to define a continuous accommodation space or duct 26e for the zipper strips 25. When another bag width and zipper strip length has to be used, a filling tube/form shoulder assembly adapted to those sizes can be placed. In FIG. 8A it can be seen that the filling tube 9 forms a unit with a mounting plate 27 that is attached in the frame 2 by means of bolts 28.

The form-fill-seal machine 1 shown in the FIGS. 1—3 works as follows. Via the control means and the operation panel 10 a number of basic data are entered by the operator. The most important of them being: type of bag, bag length and bag width, and the type of the longitudinal seal. After that the control means indicate via the operation panel at which position the roll of foil 4 has to be placed at the support shaft 5, so that later the packaging material has the correct position with respect to the form shoulder 8.

To that end the support shaft 5 is provided with a calibration. The control unit controls the motor 39 based on the data regarding the bag width and the type of bag to bring the device 11 at the wanted location in width direction. This takes place without foil and is the so-called width positioning.

The operator places the roll of foil 4 at the rear side of A of the machine 1. Foil web material 6 is manually pulled from the roll and guided about the various end rolls 7, about the form shoulder 8 and about the filling tube 9, until the foil is at least in engagement with the vacuum conveyor belts 20.

Subsequently the machine 1 is left to run for a while. During this running the tracer spots 40 are noticed by means of a photo cell 17. The position of the photo cell 17 and the encoder 16 with respect to the transverse sealing jaws 21a, 21b are exactly known in the control device, wherein the tracer spot distance t has also been entered via panel 10. The tracer spot distance t corresponds to the bag length. Between the tracer spots a printing pattern is present. The transverse seals are of course not meant to be made through the printing pattern.

By means of the control device, based on the data mentioned, and by means of the vacuum bands 20, the correct length of foil is transported and positioned such with respect to the transverse sealing jaws 21a/b that, after said jaws close, the printing pattern on the ready packaging, is correct. The packaging machine runs in so-called "photo cell".

After the machine 1 runs "in photo cell" the distance between the tracer spot and the cutting line is manually measured on a package made. Said value (L1) is as yet entered via the operation panel 10 into the control means. After that the operator presses a key (trial cycle). The machine 1 then makes a packaging, the photo cell 14 and the encoder 15 at the rear side of the machine 1 becoming active. The encoder 15 then measures the web length that passes over a measurement time and the photo cell 14 registers the moment the tracer spot passes by the photo cell 14. When the foil transport stops again, the transverse seal jaws close and the cutting blade cuts off the packaging, the encoder 15 has measured what length of web lies between the position of the tracer spot 40 at that moment and the position of the tracer spot when it was noticed by the photo cell 14. Said distance L2 is compared with the distance L1. Based on the difference between L1 and L2, the physical distance between the photocell 14 and the position of the pre-seal unit 12, the bag length and the physical position (distance) of the post seal jaw placed in both transverse jaws for the zipper strip to the packaging with respect to the cutting blade that is present in the transverse sealing jaws, the control means control the spindle motor 71 to move (here in horizontal direction, guided by the horizontal slits 70) the buffer roll 7a such that the zipper strip is sealed in the packaging material at the correct position, seen in web direction, with respect to the tracer spot by means of pre-seal unit 12.

By thus not using the physical distance between the transverse sealing jaws 21a,b and the position of the pre-seal unit, the control system is insensitive to errors caused by elastic foils, as a result of which the theoretical distances might not correspond to the actual distances, as well as length deviations as a result of the presence of many pre-sealed zipper strips on the web. Positioning the zipper strip 25 with respect to the tracer spot 40 is actually taking place by means of an autonomous system at the rear side A of the machine.

The further adjustment of the zipper strip applicator device 11 itself takes place as follows. The device 11 is entirely pulled backwards a length out of the machine by the operator. As a result a maximum accessibility for entering the zipper strip is created. Tests can then also be run in the device 11 in order to see whether all its functions are working. The zipper strip 25 is manually guided through the passage slit 36, and laid on the vacuum band 43, the teeth 46 extending between the male and female part strips. Subsequently the length of engagement is adjusted by the second conveyor 44 via the adjustment button 74, with which the series of apertures accompanying the active length in question can be brought into active connection with the vacuum band and the vacuum source. Via sensor 73 the active length is noticed and passed on to the control means, and shown on the operation panel 10. When testing the positioning of the zipper strip 25 by means of the second conveyor 44 use can be made of the calibration 47, extending from the blade and indicating how long the cut-off zipper strip portion is.

After said adjustment is completed the operator will push back the device 11 into the machine, a correct positioning of the device 11 again being noticed by a sensor that is not further shown, as a result of which the machine is released by the control means at this point.

After a certain period of test driving, the control means ensuring a correct adjustment, the machine 1 is ready for the form-fill-seal process of the bags. The web 6 here runs in the direction C, the zipper strips 25 being applied in the first station at the location of the applicator device 11.

The application of zipper strips 25 takes place as follows. The zipper strip is retained by means of the first conveyor 43 by vacuum, and transported in the direction G (see FIG. 4B). The remaining portion of the zipper strip 25 is in stock in a long loop, so that no particular counter forces have to be overcome. As a result no slipping will arise between the zipper strip 25 and the conveyor 43. During transport the teeth 46 extend between both flanges 25a and 25b of the zipper strip 25. As a result the disadvantageous results of the undulation in the zipper strip 25 are counteracted, and the—particularly in the horizontal plane—stretched transport of the zipper strip 25 is improved.

When the leading end of the zipper strip 25 arrives at the second conveyor 44, said end is engaged by the vacuum of said conveyor. By means of the servo motors 48 and 49 controlled by the control device, both conveyors 43 and 44 are driven, at the same speed, or the second conveyor at a little higher speed to keep the zipper strip stretched at all times. A resolver present in the servo motor 48 together with a large transmission ratio ensures that a very accurate length of zipper strip is discharged to the second conveyor 44. As soon as the correct length has been reached the blade 51 is activated. The first conveyor 43 can be considered a supply conveyor and a length/dosing conveyor.

During cutting the vacuum is maintained in both conveyors. Subsequently the servo motor 49 is activated again, and the conveyor 44 is driven in the direction G, to bring the cut-off zipper strip 25 at a correct position in transverse direction of the web 6 and retain it under it. A resolver present in the servo motor 49 together with a large transmission ratio ensures that the cut-off length of zipper strip is positioned accurately. The pre-seal unit 12 is then operated to attach the flange 25c to the foil web 6. The silicone strip 50 here serves as anvil.

The pre-seal unit 12 attaches the zipper strip 25 at the upper side of the foil web, which later on forms the inner side of the bag. The seal beam 81/82 of the seal unit 12 is pneumatically driven. The position of the seal beam as well is adjustable in transverse direction. Depending on the width of the zipper strip 25 that has to be sealed in, another seal beam is placed in the holder.

When during the operation of the machine 1 the foil web should slide in transverse direction this is noticed by the web side sensor 18. This observation is converted by the control device into a proportional drive of the spindle motor 39.

Alternatively it can be provided that the control device instead of the spindle motor 39 then controls the servo motor 49 in a changed manner. In that case the adjustment of the active length of the band 44 will of course also have to be sufficient to that end.

It is noted that the control device also during normal operation keeps on noticing the positions of the tracer spots 40 by means of the aforementioned sensors. It occurs that the distance one to the other of the tracer spots 40 varies on a roll. In that case automatic leveling will take place in the web length between the sensor 14 and the transverse seal jaws 21a,b by operating the spindle motor 71 and thus the movement of the roll 7a. This then is the length-following system.

The form-fill-seal machine 1 will in general be operative in steps. However, there are continuous web transporting form-fill-seal machines. The provisions according to the invention can be used in them as well, particularly advantageous use being made of the arrangement with the moveable buffer roll 7a. The machine 1 is here provided with a brake 80 for the web 6, to keep it entirely still at the location of the zipper strip applicator device 11. A zipper strip can be applied in a very controlled manner. After that the operation of the brake 80 is stopped by the control device and web transport takes place again, until the next zipper strip has to be applied.

During the web transport, the control device will operate the spindle motor 71 to move the roll 7a from the front to the rear. As a result the web length is increased there, and namely by a double distance compared to the distance of movement of the roll 7a. The buffer length thus created is equal to the web length that should be transported at a normal operation when the brake 80 would not be activated. For an uninterrupted, continuous operation, sufficient web material should then at all times be in stock for the vacuum conveyor belts 20 at the front of the machine 1.

What is claimed is:

1. Form-fill-seal machine comprising means for moving a web of packaging material through the machine according to a process path and means for transforming the web into filled bags, furthermore comprising a zipper strip applicator device having means for supplying a zipper strip for each bag transverse to the process path, which supply means comprise a first and a second conveyor, which in the supply direction of the zipper strip are placed one behind the other and are both provided with means for retaining or engaging the zipper strip during supply, a blade being placed between the first and the second conveyor for cutting the zipper strip and the first and the second conveyor being provided with their own first and second drive means.

2. Form-fill-seal machine according to claim 1, provided with control means for the first and second drive means and the blade, the control means being adjusted to consecutively operate the first drive means to transfer a predetermined length of zipper strip to the second conveyor, to subsequently operate the blade and then operate the second conveyor for positioning the cut-off zipper strip portion transverse to the web.

3. Form-fill-seal machine according to claim 2, the control means being adjusted to let both conveyors move at the same speed during the supply of the length of zipper strip.

4. Form-fill-seal machine according to claim 3, the retaining means of the first and the second conveyors being controlled by the control means.

5. Form-fill-seal machine according to claim 4, the control means being adjusted for continuously activating the engaging means of the first and second conveyors.

6. Form-fill-seal machine according to claim 4, the engaging means being vacuum means.

7. Form-fill-seal machine according to claim 6, provided with means for adjusting the active length of the vacuum means for the second conveyor.

8. Form-fill-seal machine according to claim 7, the control means being provided with means for comparing an entered zipper strip length and the position in transverse direction to the web and the adjusted length of the vacuum means, and of means for releasing the drive of the machine based on the outcome of said comparison.

9. Form-fill-seal machine according to claim 8, the means for adjusting the active length of the vacuum means for the second conveyor comprising a tube to be connected to a vacuum source, which tube in its circumference is provided with series of apertures of different length extending in tube direction, and which is rotatable in an adjustable manner to let a selected series of apertures form the connection between the apertures in the vacuum band and the tube.

10. Form-fill-seal machine according to claim 1, at least the second conveyor being placed below the web.

11. Form-fill-seal machine according to claim 1, furthermore provided with means for guiding the zipper strip on the first and second conveyor.

12. Form-fill-seal machine according to claim 11, the guiding means comprising a rigid guiding strip, which is positioned to extend between the male and female parts of the zipper strip.

13. Form-fill-seal machine according to claim 12, the guiding strip being interrupted, particularly being formed by a series of teeth, preferably having inclined side edges.

14. Form-fill-seal machine according to claim 13, the teeth having rounded tips.

15. Form-fill-seal machine according to claim 11, the guiding strip being positioned to—considered in process path—engage the upstream side of the zipper strip, between the strip members containing the male and female part.

16. Form-fill-seal machine according to claim 1, the zipper strip applicator device also being provided with an anvil strip for use in the pre-sealing of the zipper strip to the web.

17. Form-fill-seal machine according to claim 16, the anvil strip being situated at the—considered in process path—downstream side of the second conveyor.

18. Form-fill-seal machine according to claim 1, the zipper strip applicator device being supported on an auxiliary frame, which itself is supported in a main frame of the machine, the auxiliary frame with respect to the main frame being moveable between a retracted operative position and an extended adjustment position.

19. Form-fill-seal machine according to claim 18, furthermore provided with a calibration on the second conveyor, extending along the retaining means, preferably starting at the location of the blade.

20. Form-fill-seal machine according to claim 18, further provided with control means that have been provided with means for noticing the operative position of the auxiliary frame and with means for releasing the drive of the machine based on that observation.

21. Form-fill-seal machine according to claim 1, wherein the first and second conveyors are similar.

22. Form-fill-seal machine according to claim 1, wherein the means for retaining or engaging the zipper strip during supply, retain or engage the zipper strip at various locations along the length of the zipper strip.

23. Form-fill-seal machine according to claim 1, further provided with control means having means for entering data in it regarding the length of the bag and possibly the type of bag, and with means for positioning the zipper strip applicator device in transverse direction, controlled by the control means in response to the data regarding the bag width and possibly the type of bag, in order to during an adjustment stage of the machine correctly position the zipper strip applicator device in the machine, considered in transverse direction.

24. Form-fill-seal machine according to claim 1, further provided with control means having means for noticing the position of a longitudinal edge of the web with respect to a fixed reference in the machine, the control means being adapted to control the drive of the second conveyor in the movement of the zipper strip to-be applied, in response to the data from the edge noticing means.

25. Form-fill-seal machine according to claim 1, further provided with control means having means for noticing the position of a longitudinal edge of the web with respect to a fixed reference in the machine and with means for the positioning in transverse direction of the zipper strip applicator device, in response to the data from the edge noticing means.

* * * * *